July 18, 1933.　　W. S. HAWKINS ET AL　　1,918,701

ANTIGLARE SHIELD

Filed Nov. 5, 1931

INVENTORS
Walter S. Hawkins
George D. Hawkins
William J. Hawkins
By Jack Snyder
Attorney Patented July 18, 1933

1,918,701

UNITED STATES PATENT OFFICE

WALTER S. HAWKINS, GEORGE D. HAWKINS, AND WILLIAM J. HAWKINS, OF WILKINSBURG, PENNSYLVANIA

ANTIGLARE SHIELD

Application filed November 5, 1931. Serial No. 573,146.

Our invention relates to an anti-glare shield for motor vehicle lamps, somewhat of the type disclosed in our co-pending application for Letters Patent of the United States, bearing filing date the 11th day of July, 1931, and Serial No. 550,132.

Important objects of the invention are to provide an opaque shield of the character described, which can easily be attached to the tip of the bulb so that the operator of an approaching automobile will not receive the glare of the light, which will not interfere with but augment the full light power of the lamp by reflexively directing the rays from the lamp against the reflector so the light will be diffused over a wide area of road without causing any glare, and which requires no adjustment permitting the proper mounting of the shield even by an unskilled person.

Further objects of the invention are to provide a device of the class stated, which is simple in its construction and arrangement, durable and efficient in its use, attractive in appearance, positive in its action, and comparatively inexpensive to manufacture.

With the foregoing and other objects in view which will appear as the description proceeds, the invention resides in the novel construction, combination and arrangement of parts herein illustrated and described, but it is to be understood that the drawing is merely illustrative of a preferred embodiment of the invention, and that the actual needs of practice and manufacture may necessitate certain mechanical variations. It is therefore, not intended to limit the invention to the disclosure thereof illustrated, but rather to define such limitations in the appended claims.

In the drawing wherein like numerals of reference designate corresponding parts throughout the several views:—

Figure 1:
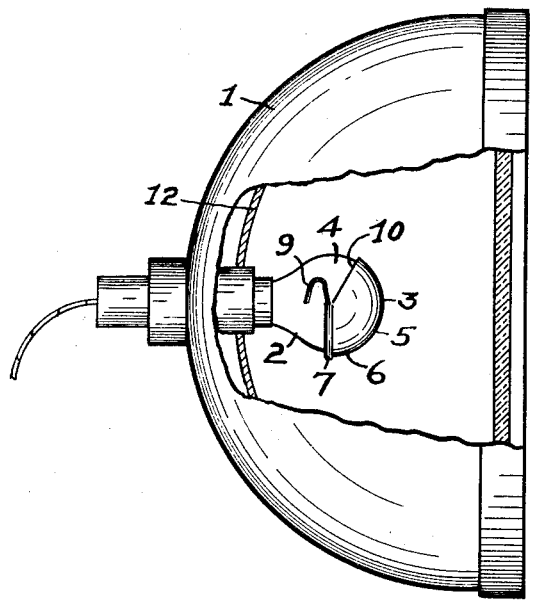
Figure 1 is a side view of an automobile headlight, partly broken away, illustrating the anti-glare shield attached to the bulb.

Referring in detail to the drawing 1 represents a motor vehicle headlight of standard conventional construction and including a regulation type of electrical bulb 2.

Our improved anti-glare shield 3 is mounted on the enlarged forward end portion 4 of the bulb 2, and comprises a substantially cup-shaped member 5 having a rearwardly projecting lower portion 6. The shield 3 is constructed from an integral piece of thin sheet metal, preferably aluminum. It is evident, however, that the shield 3 may be constructed from any other suitable, opaque material.

The rear edge margin of the rearwardly propecting lower portion 6 of the shield 3 is turned outwardly and forward to form a roll 7. A resilient clamping wire 8 is fixedly embedded and held in the roll 7, and the end portions thereof project beyond the respective ends of the said roll 7. Each of the projecting end portions of the wire 8 is bent to form a substantially inverted U or hook-shaped clamp 9. The latter is disposed rearwardly of and above the roll 7 and has its free end extending downwardly.

The rear edge 10 of the upper portion of the shield 3 projects rearwardly from the top of the latter to the respective upper ends of the roll 7.

The formation of the roll 7 is such that the inner side 11 thereof is disposed inwardly of the curved surface of the inner periphery of the shield 3, to augment its gripping action on the bulb 2.

Figure 2:
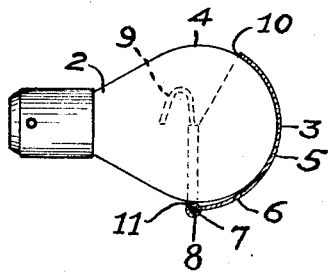
Figure 2 is a side view of a bulb showing the shield attached therewith, said shield being in cross section.

When the shield 3 is mounted in proper position on the bulb 2, the roll 7 extends circumferentially along and engages the lower one-half portion of the bulb 2 at a point slightly rearward of the greatest diameter of the latter. The roll 7 is disposed vertically and the upper ends thereof are approximately on the horizontal plane of the longitudinal axial center of the bulb 2. The clamps 9 in a flatwise or lateral position engage respective sides of the bulb 2 above the axial center and rearwardly of the greatest diameter of the latter, as clearly shown in Figures 1 and 2.

The top of the shield 3 is marked with the word "Top" to apprise an unacquainted user of the proper position of the shield 3 on the bulb 2. In mounting the shield 3 to a bulb 2 it is only necessary to force the former rearwardly on the latter in a manner to position the roll 7 squarely vertical around the lower one-half portion of the bulb 2. When so positioned the shield 3 requires no adjustment to most advantageously effect the purpose for which it is intended.

Figure 3:
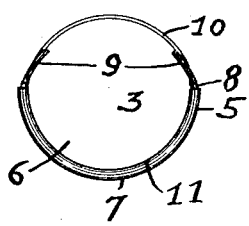
Figures 3 and 4 are, respectively, inner end and top plan views of the shield.
Figure 4:
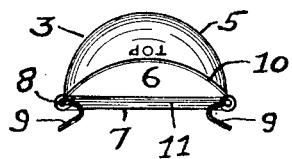

The engagement of the bulb 2 by the clamps 9 in conjunction with the engagement of the former inner side of the roll 7, in the manner stated, will securely hold the shield 3 against movement under all conditions, but permits the convenient removal and replacement of the shield 3 when required. Normally, the clamps 9 are disposed inwardly beyond the rear edge 10, of the shield 3, as shown in Figure 3, to augment their holding action when spread in engaging the bulb 2.

The efficiency of our improved shield 3 is enhanced by providing the concaved periphery thereof with a reflector surface, whereby the beam of light is intensified when thrown reflexively therefrom against the headlight reflector 12, from whence it is directed to the road, in the usual manner.

What we claim is:

1. An anti-glare shield of the character described, comprising a substantially cup-shaped member fitting on the forward end of an electric light bulb, the approximate lower one-half portion of said member projecting rearwardly beyond the upper one-half portion thereof, the edge margin of said lower portion being turned to form a roll, and a resilient clamping element being fixedly embedded in said roll and having projecting end portions engaging said bulb for holding the said member in place on the latter, the inner side of said roll being disposed inwardly beyond the curved surface of the inner periphery of said member.

2. An anti-glare shield of the character described, comprising a substantially cup-shaped member fitting on the forward end of an electric light bulb, the approximate lower one-half portion of said member projecting rearwardly beyond the upper one-half portion thereof, the edge margin of said lower portion being turned to form a roll, and a resilient clamping element being fixedly embedded in said roll and having projecting end portions, the projecting end portions of said clamping elements being substantially hook-shaped and laterally engaging said bulb on respective sides and above the axial center of the latter for holding said member in place on said bulb.

3. An anti-glare shield of the character described, comprising a substantially cup-shaped member fitting on the forward end of an electric light bulb, the approximate lower one-half portion of said member projecting rearwardly beyond the upper one-half portion thereof, the edge margin of said lower portion being turned to form a roll, and a resilient clamping element being fixedly embedded in said roll and having projecting end portions, the projecting end portions of said clamping elements being substantially hook-shaped and laterally engaging said bulb on respective sides and above the axial center of the latter for holding said member in place on said bulb, the inner side of said roll being disposed inwardly beyond the curved surface of the inner periphery of said member.

4. A spherically curved reflecting shield to be mounted upon the spherically curved forward portion of an electric light bulb and having its edge bent into a tubular bead which projects inwardly beyond the curve of the inner surface of the shield, the shape of the shield being such that the bead will be located at the rear of the center of the spherically curved portion of the bulb, and a resilient wire held within the tubular bead and having its ends projecting beyond the ends of the bead and forming relatively short holding elements for engagement with the bulb.

5. A reflecting shield to be mounted upon the curved forward end portion of an electric light bulb and having an internal curvature and dimension to fit snugly upon such curved forward portion, the inner surface of the shield serving as a reflecting surface, the said shield having its marginal edge extending rearwardly of the transverse maximum diameter of the bulb, said marginal edge being bent into a tubular bead, and a resilient wire held within the tubular bead and having relatively short end portions projecting beyond the ends of the tubular bead, said end portions being bent into generally U-shaped elements extending rearwardly beyond said transverse maximum diameter and so positioned that the inner sides of the generally U-shaped elements contact with the sides of the bulb at a point rearwardly of said tranverse maximum diameter.

WALTER S. HAWKINS.
GEORGE D. HAWKINS.
WILLIAM J. HAWKINS.